US012625458B2

(12) United States Patent
Yamamoto

(10) Patent No.: US 12,625,458 B2
(45) Date of Patent: May 12, 2026

(54) SPRING MOUNTING STRUCTURE, SHEET HOUSING DEVICE, WASTE TONER CONTAINER, AND IMAGE FORMING APPARATUS

(71) Applicant: Kazuya Yamamoto, Kanagawa (JP)

(72) Inventor: Kazuya Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/597,095

(22) Filed: Mar. 6, 2024

(65) Prior Publication Data

US 2024/0319657 A1 Sep. 26, 2024

(30) Foreign Application Priority Data

Mar. 20, 2023 (JP) ................................. 2023-044244

(51) Int. Cl.
| | |
|---|---|
| *G03G 21/16* | (2006.01) |
| *F16F 1/12* | (2006.01) |
| *G03G 15/00* | (2006.01) |
| *G03G 21/10* | (2006.01) |
| *G03G 21/12* | (2006.01) |

(52) U.S. Cl.
CPC ........... *G03G 21/1647* (2013.01); *F16F 1/12* (2013.01); *G03G 15/6502* (2013.01); *G03G 21/105* (2013.01); *G03G 21/12* (2013.01); *B65H 2402/54* (2013.01); *B65H 2405/12* (2013.01); *G03G 2215/00392* (2013.01)

(58) Field of Classification Search
CPC ........... B65H 2402/54; B65H 2405/12; B65H 2405/121; G03G 21/12; F16F 1/12; F16F 1/122; F16F 1/125; F16F 1/128
See application file for complete search history.

(56) References Cited

U.S. PATENT DOCUMENTS 3,814,357 A * 6/1974 Rontgen ................. F16F 1/128
248/573

FOREIGN PATENT DOCUMENTS

| JP | 2016-016987 A | 2/2016 |
|---|---|---|
| JP | 2020-022361 A | 2/2020 |

* cited by examiner

*Primary Examiner* — Jeremy R Severson
(74) *Attorney, Agent, or Firm* — Harness, Dickey & Pierce, P.L.C.

(57) ABSTRACT

A spring mounting structure includes a first structural member and a second structural member. The first structural member includes: a first abutting surface to abut on one end of a compression spring; and a temporary holding portion to temporarily hold the compression spring in an uncompressed state. The second structural member includes: a second abutting surface to abut on another end of the compression spring; and a tapered surface to, when the second structural member is assembled in a predetermined assembling direction intersecting a compression direction of the compression spring, guide the other end of the compression spring in the uncompressed state temporarily held by the temporary holding portion to the second abutting surface such that the compression spring is mounted in a compressed state between the first and second abutting surfaces.

20 Claims, 15 Drawing Sheets

1

SPRING MOUNTING STRUCTURE, SHEET HOUSING DEVICE, WASTE TONER CONTAINER, AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-044244, filed on Mar. 20, 2023, in the Japan Patent Office, the entire disclosure of which is hereby incorporated by reference herein.

TECHNICAL FIELD

Embodiments of the present disclosure relate to a spring mounting structure, a sheet housing device, a waste toner container, and an image forming apparatus.

RELATED ART

There is known a spring mounting structure for mounting a compression spring in a predetermined compressed state between a first abutting surface and a second abutting surface in a structural body in which a first structural member including the first abutting surface abutting on one end of the compression spring and a second structural member including the second abutting surface abutting on the other end of the compression spring are assembled in a predetermined assembling direction intersecting a compression direction of the compression spring.

For example, Japanese Unexamined Patent Application Publication No. 2020-22361 discloses a structure, in which a terminal cover is slidably mounted to a battery mounting member to which a battery pack is mounted, of a charger for charging the battery pack which is used as a power source of a power tool. The terminal cover is slidable between a covering position where the terminal cover covers a connection terminal and an exposing position where the connection terminal is exposed to the outside, and is biased toward the covering position by a compression spring.

When the compression spring is mounted, first, the compression spring is temporarily held in a compressed state between a biasing receiving member (first abutting surface) of the terminal cover (first structural member) and a temporary fixing rib (temporary holding portion) of the terminal cover. Then, the terminal cover in a state where the compression spring is temporarily held is assembled to the battery mounting member from a direction (predetermined assembling direction) orthogonal to (intersecting) the compression direction of the compression spring. According to the movement at the time of assembling, a support base end (the other end) of the compression spring abutting on the temporary fixing rib of the terminal cover comes into contact with a guide inclined surface (tapered surface) of the battery mounting member, moves along the guide inclined surface to be compressed, and separates from the temporary fixing rib of the terminal cover. Then, when the support base end of the compression spring gets over the guide inclined surface of the battery mounting member, the support base end reaches a spring receiving rib (second abutting surface) provided in the battery mounting member (second structural member). As a result, the compression spring is mounted in a predetermined compressed state between the biasing receiving member of the terminal cover and the spring receiving rib of the battery mounting member.

SUMMARY

According to an embodiment of the present disclosure, a spring mounting structure includes a first structural member and a second structural member. The first structural member includes: a first abutting surface to abut on one end of a compression spring; and a temporary holding portion to temporarily hold the compression spring in an uncompressed state. The second structural member includes: a second abutting surface to abut on another end of the compression spring; and a tapered surface to, when the second structural member is assembled to the first structural member in a predetermined assembling direction intersecting a compression direction of the compression spring, guide said another end of the compression spring in the uncompressed state temporarily held by the temporary holding portion to the second abutting surface such that the compression spring temporarily held by the temporary holding portion is mounted in a compressed state between the first abutting surface and the second abutting surface.

According to another embodiment of the present disclosure, a sheet housing device includes a sheet housing, a handle, the spring mounting structure, the compression spring, and a handle holder. The sheet housing houses a sheet. The handle is mounted to the sheet housing, with the handle being movable between a housing position and a pull-out position. The compression spring biases the handle from the pull-out position toward the housing position. The handle holder holds the handle mounted to the sheet housing in the sheet housing. The handle is the first structural member. The handle holder is the second structural member.

According to still another embodiment of the present disclosure, a waste toner container includes a waste toner storage, an opening-and-closing member, the spring mounting structure, and the compression spring. The waste toner storage stores a waste toner. The opening-and-closing member opens and closes a waste toner receiving port of the waste toner storage. The compression spring biases the opening-and-closing member from an open position to a closed position. The waste toner storage includes a spring mounting portion to which the compression spring is mounted. The spring mounting portion is the first structural member. The opening-and-closing member is the second structural member.

According to still yet another embodiment of the present disclosure, an image forming apparatus includes the spring mounting structure.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
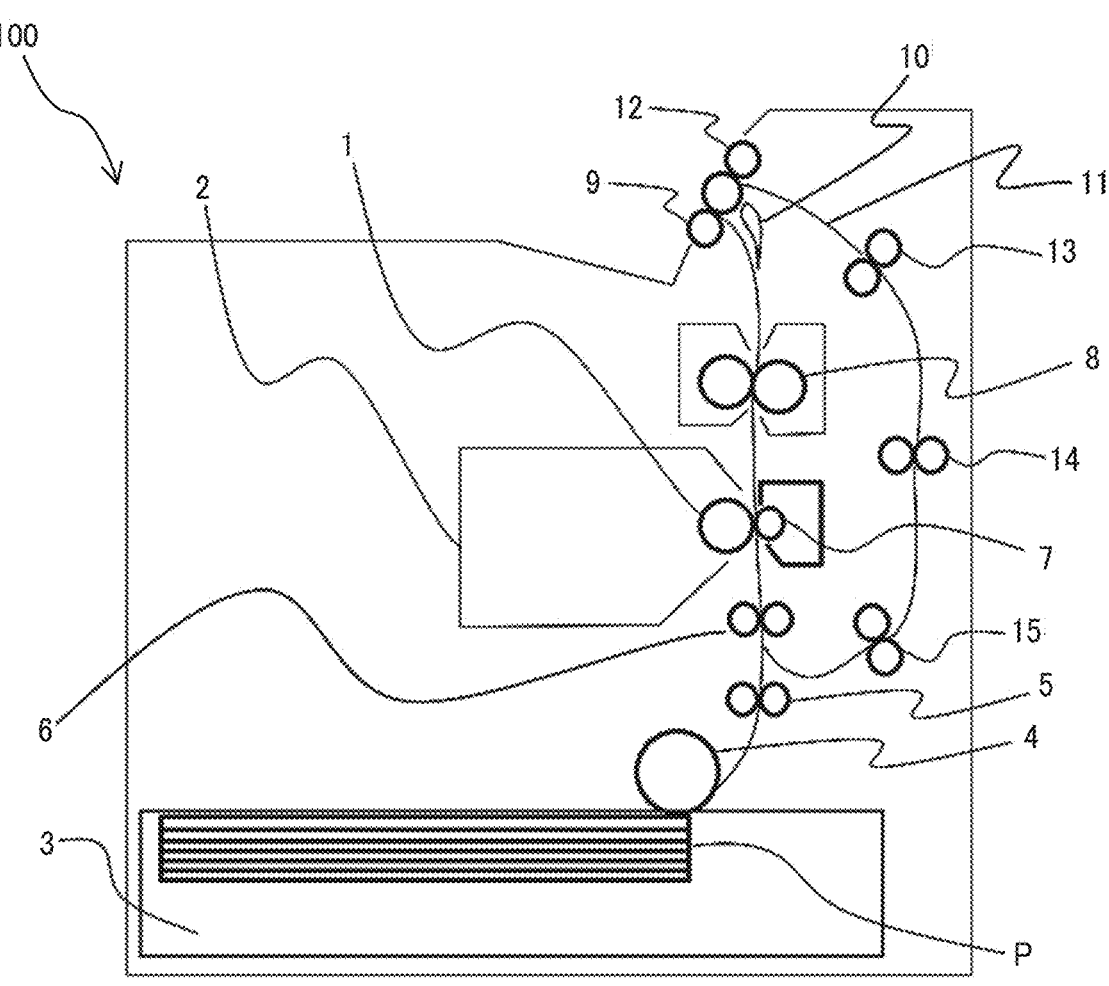
FIG. 1 is a schematic configuration diagram illustrating a printer according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, as an image forming apparatus to which a spring mounting structure according to an embodiment of the present disclosure is applied, an electrophotographic printer (hereinafter, simply referred to as printer) that forms an image by an electrophotographic method will be described.

The present embodiment is an example in which a spring mounting structure according to an embodiment of the present disclosure is applied to a sheet housing device of the image forming apparatus, but the spring mounting structure can be widely applied to other devices and members (waste toner containers and the like) mounted on the image forming apparatus, apparatuses other than the image forming apparatus, and the like.

In other words, an embodiment of the present disclosure is applicable to a spring mounting structure for mounting a compression spring temporarily held by a temporary holding portion of a first structural member in a predetermined compressed state between a first abutting surface and a second abutting surface in a structural body in which the first structural member including the first abutting surface abutting on one end of the compression spring and a second structural member including the second abutting surface abutting on the other end of the compression spring are assembled in a predetermined assembling direction intersecting a compression direction of the compression spring.

FIG. 1 is a schematic configuration diagram illustrating a printer 100 according to an embodiment.

A printer 100 illustrated in FIG. 1 is a monochrome printer, and an image former 2 is provided in a main body of the apparatus. The image former 2 includes a photoconductor 1 as an image bearer that bears an image on the surface, a charging roller as a charger that charges the surface of the photoconductor 1, a developing device as a developer that visualizes a latent image on the photoconductor 1, a cleaning blade as a cleaner that cleans the surface of the photoconductor 1, and the like. In addition, a light emitting diode (LED) head array as an exposure unit for exposing the surface is disposed around the photoconductor 1.

When an image forming operation is started, the photoconductor 1 of the image former 2 is rotationally driven counterclockwise in FIG. 1, and the surface of the photoconductor 1 is uniformly charged to a predetermined polarity by the charging roller. Based on image information input from an external device, the charged surface of the photoconductor 1 is irradiated with light from the LED head array, and an electrostatic latent image is formed on the surface of the photoconductor 1. Thus, toner is supplied to the electrostatic latent image on the photoconductor 1 by the developing device, thereby developing (visualizing) the electrostatic latent image as a toner image.

When the image forming operation is started, a transfer roller 7 is rotationally driven, and at least one of a predetermined direct current voltage (DC) and alternating current voltage (AC) is applied to the transfer roller 7, so that a transfer electric field is formed between the transfer roller 7 and the photoconductor 1.

In a lower portion of the apparatus main body, a sheet feeding roller 4 starts a rotational drive, and a sheet P is fed from a sheet feeder 3 serving as the sheet housing device. The fed sheet P is conveyed by a conveying roller pair 5, and the conveyance is temporarily stopped by a registration roller pair 6. Thereafter, the rotational drive of the registration roller pair 6 is started at a predetermined timing, and the sheet P is conveyed to a transfer nip at the timing when the toner image on the photoconductor 1 reaches the transfer nip with the transfer roller 7. Then, the toner image on the photoconductor 1 is transferred onto the sheet P by the transfer electric field. The residual toner on the photoconductor 1 that has not been transferred to the sheet P is removed by the cleaning blade.

The sheet P to which the toner image has been transferred is conveyed to a fixing device 8, and the toner image on the sheet P is fixed to the sheet P in the fixing device 8. Then, the sheet P is discharged to the outside of the apparatus by a discharge roller pair 9 and stocked on a discharge tray.

In addition, the printer 100 of the present embodiment is provided with a bifurcating claw 10 for changing the conveyance direction and a reversing roller pair 12 for feeding the sheet P to a reverse conveyance path 11 in order to form images on both surfaces of the sheet P. One roller of the reversing roller pair 12 also serves as the discharge roller pair 9. The reverse conveyance path 11 is provided with a double-sided inlet roller pair 13, a double-sided intermediate roller pair 14, and a double-sided outlet roller pair 15.

When an image is formed on both sides of the sheet P, the bifurcating claw 10 is rotated to switch the position of the bifurcating claw 10 before the sheet P is conveyed from the fixing device 8 to the discharge roller pair 9. Thus, the conveyance path of the sheet P on which an image is formed on one surface is changed, and the sheet P is sent to the reversing roller pair 12 instead of the discharge roller pair 9.

The sheet P sent to the reversing roller pair 12 is conveyed in the reverse direction at a timing when a rear end of the sheet P cannot be completely removed, and is sent to the reverse conveyance path 11.

Then, the sheet P passes through the reverse conveyance path 11 and is conveyed to the transfer nip again in a state where the front and back sides of the sheet P are reversed by the double-sided inlet roller pair 13, the double-sided intermediate roller pair 14, and the double-sided outlet roller pair 15 on the reverse conveyance path 11. Then, after the image is transferred to the other surface (back surface) of the sheet P, the image is fixed by the fixing device 8 and discharged to the outside of the apparatus by the discharge roller pair 9.

Next, a configuration of the sheet feeder 3 as the sheet housing device in the present embodiment will be described.

Figure 2:
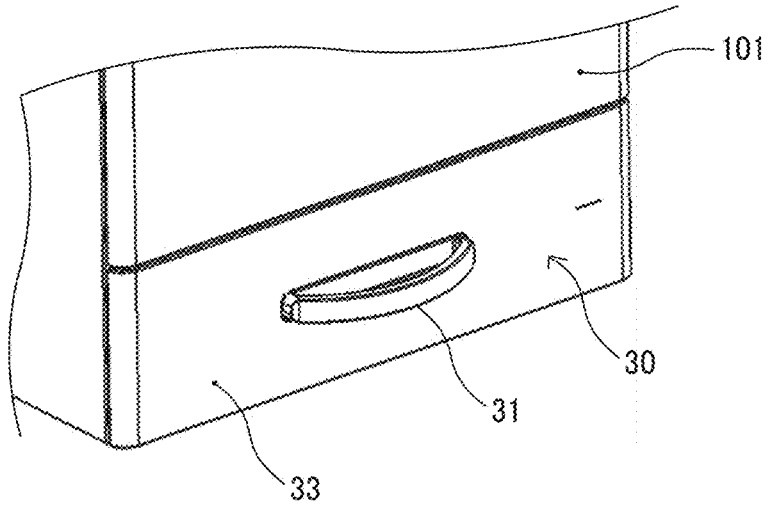
FIG. 2 is a perspective view illustrating a state where a sheet feeding tray is housed in a printer main body in the printer.

FIG. 2 is a perspective view illustrating a state where a sheet feeding tray 30 constituting the sheet feeder 3 is housed in a printer main body 101.

Figure 3:
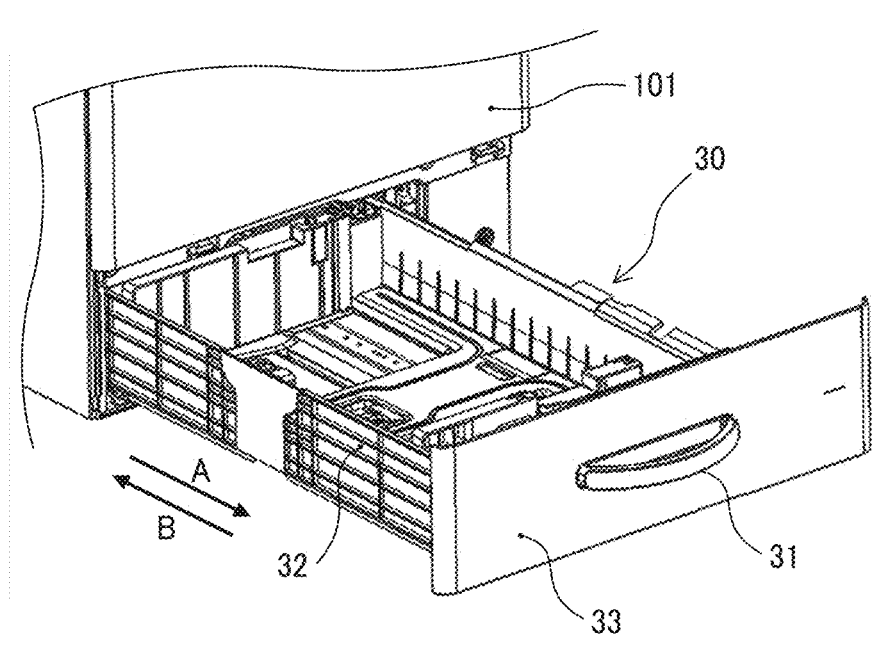
FIG. 3 is a perspective view illustrating a state where the sheet feeding tray is pulled out from the printer main body in the printer.

FIG. 3 is a perspective view illustrating a state where the sheet feeding tray 30 is pulled out from the printer main body.

The sheet feeding tray 30 is provided with a handle 31. By gripping and operating the handle 31, the user can bring the sheet feeding tray 30 into a state of being housed in the printer main body 101 as illustrated in FIG. 2 (a state where the sheet feeding tray 30 is closed) and a state of being pulled out to the front surface side of the printer main body 101 as illustrated in FIG. 3 (a state where the sheet feeding tray 30 is opened).

Figure 4:
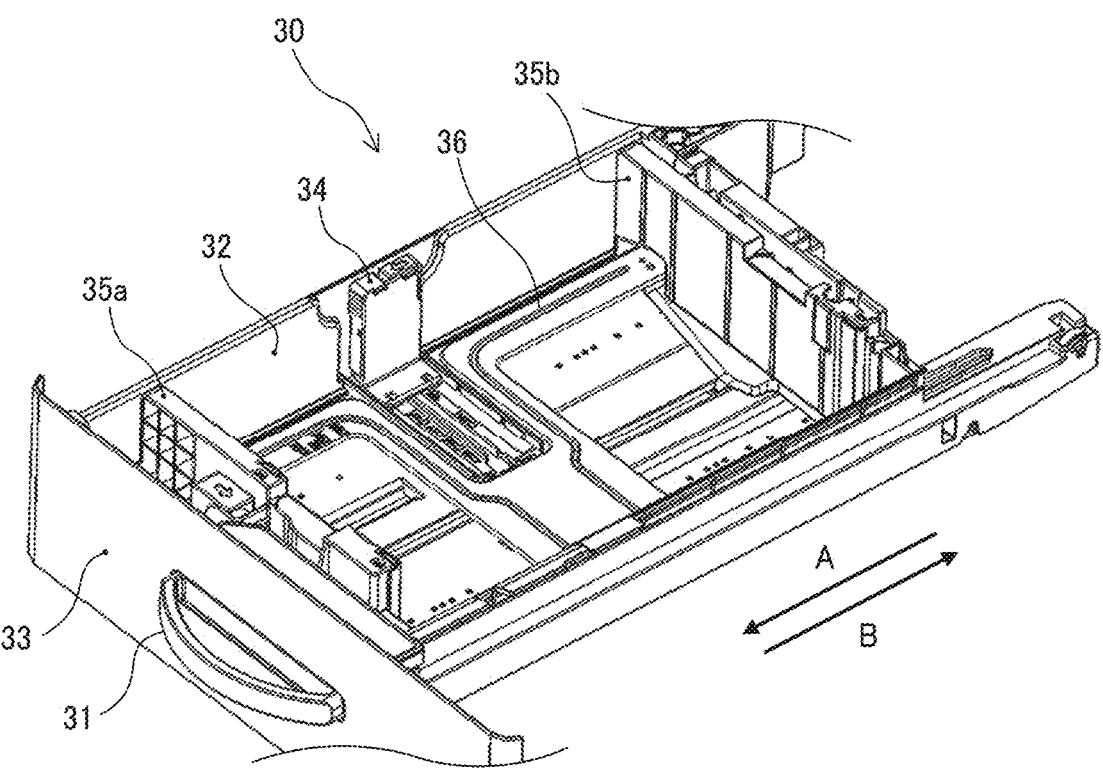
FIG. 4 is a perspective view illustrating a sheet feeding tray according to the present embodiment.

FIG. 4 is a perspective view illustrating the sheet feeding tray 30 according to the present embodiment.

The sheet feeding tray 30 mainly includes a tray member 32 as a sheet housing which is a basic structural body. The tray member 32 is provided with a tray cover 33 on the printer front surface side. The tray member 32 is provided with the handle 31 which is used when a user performs an opening or closing operation of the sheet feeding tray 30. The handle 31 is slidably mounted to the tray member 32 along a pull-out direction A and a housing direction B of the sheet feeding tray 30.

The sheet feeding tray 30 can load the sheet P such as a paper sheet, and includes an end fence 34 that restricts a position in a sheet conveyance direction of the sheet P loaded on the sheet feeding tray 30, and side fences 35*a* and 35*b* that restrict a position in a sheet width direction orthogonal to the sheet conveyance direction. When the sheet feeding tray 30 is housed and set in the printer main body 101, the stacked sheet P is lifted by a bottom plate 36 provided inside the sheet feeding tray 30, abuts on the sheet feeding roller 4, and becomes ready to be fed. The bottom plate 36 is raised by a driving force from a driving source such as a motor or a biasing force by a biasing member such as a spring provided at a lower portion of the bottom plate 36.

Figure 5:
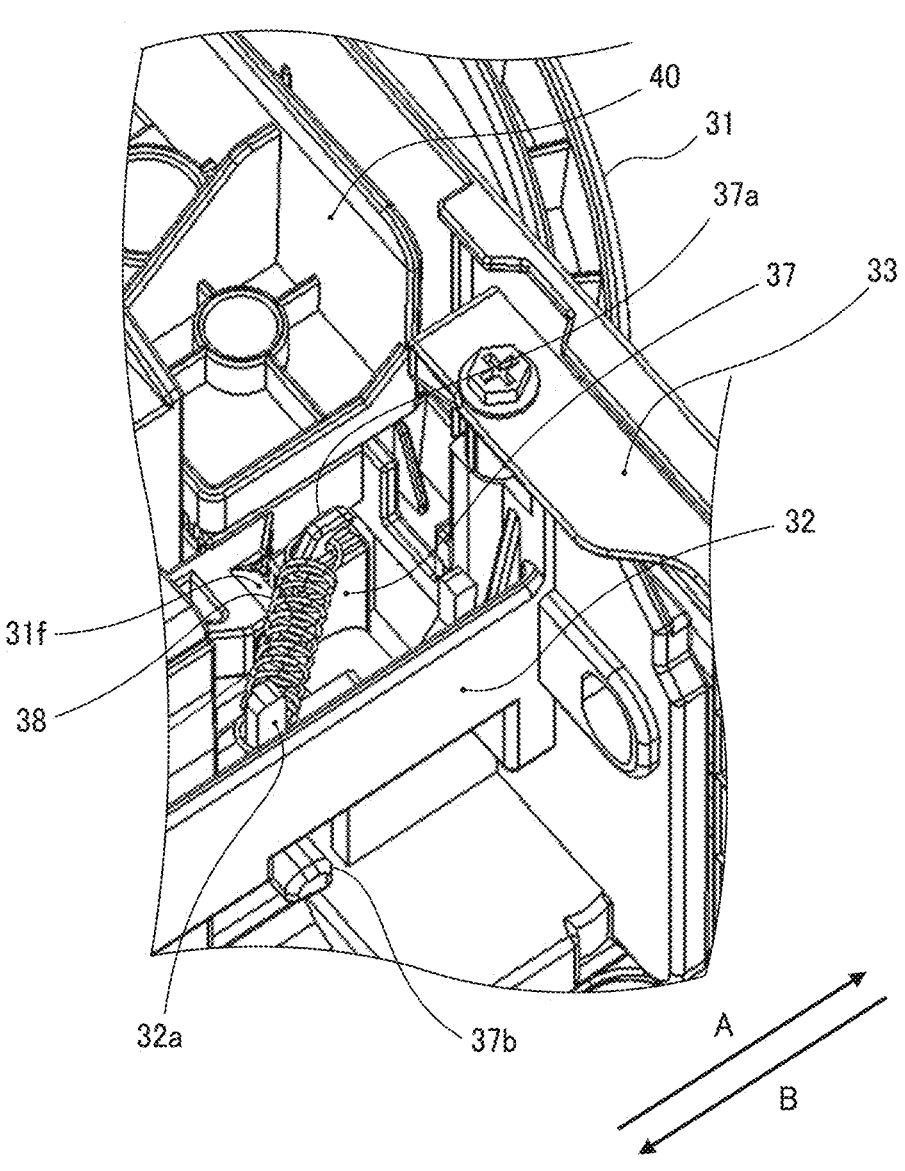
FIG. 5 is a perspective view of a periphery of a lock mechanism of the sheet feeding tray as viewed from below of the apparatus.

FIG. 5 is a perspective view of a periphery of a lock mechanism of the sheet feeding tray 30 as viewed from below the apparatus.

Figures 6A, 6B:
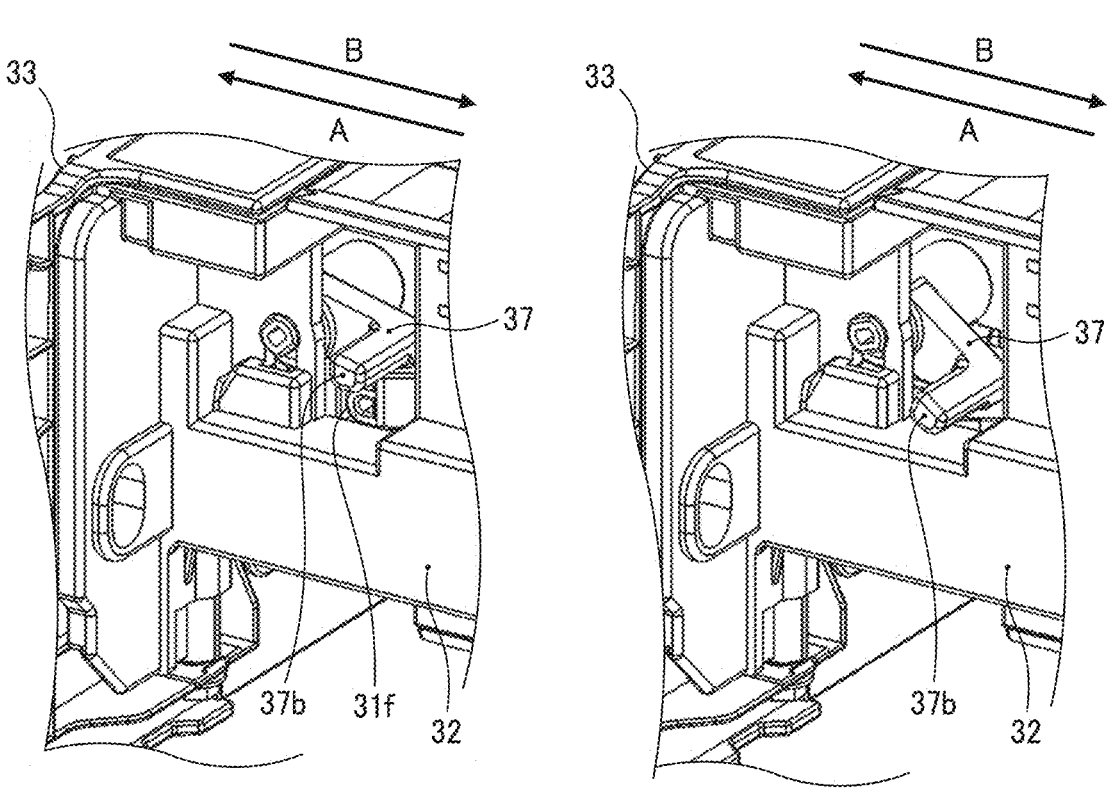
FIG. 6A is a perspective view of the lock mechanism at a locked position as viewed from a side of the apparatus.
FIG. 6B is a perspective view of the lock mechanism at an unlocked position as viewed from the side of the apparatus.

FIG. 6A is a perspective view of the lock mechanism at a locked position as viewed from a side of the apparatus, and FIG. 6B is a perspective view of the lock mechanism at an unlocked position as viewed from the side of the apparatus.

Figure 7:
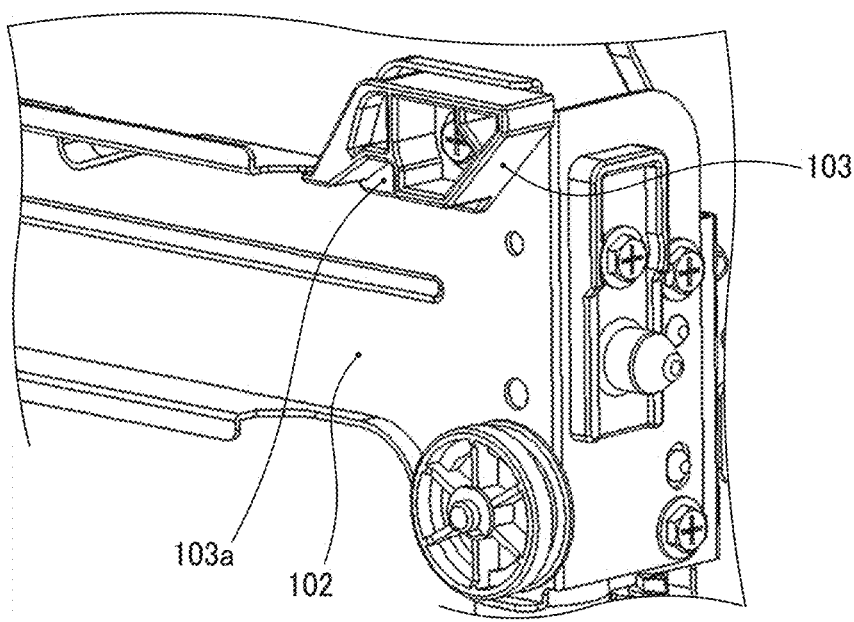
FIG. 7 is a perspective view illustrating a configuration on a printer main body side that locks the sheet feeding tray in a state of housing the sheet feeding tray in the printer main body in conjunction with the lock mechanism of the sheet feeding tray.

FIG. 7 is a perspective view illustrating a configuration on the printer main body side that locks the sheet feeding tray 30 in a state of housing the sheet feeding tray 30 in the printer main body 101 in conjunction with the lock mechanism of the sheet feeding tray 30.

As illustrated in FIG. 7, the sheet feeding tray 30 is opened and closed along a rail 102 provided in the printer main body 101. When the sheet feeding tray 30 is housed inside the printer main body 101, the sheet feeding tray 30 is brought into a locked state where the sheet feeding tray 30 is prohibited from being pulled out from the printer main body 101 by the lock mechanism provided in the sheet feeding tray.

The lock mechanism of the present embodiment includes a lock lever 37 rotatably provided with respect to the tray member 32, and a tension spring 38 mounted between a spring mounting end 37*a* of the lock lever 37 and a spring mounting end 32*a* of the tray member 32. The lock lever 37 is rotatable between a lock position where a lock end 37*b* of the lock lever 37 is raised (FIG. 6A) and an unlocked position where the lock end 37*b* of the lock lever 37 is lowered (FIG. 6B). When the lock end 37*b* is at the lock position in a state where the sheet feeding tray 30 is housed in the printer main body 101, the lock end 37*b* enters a groove 103*a* of a stopper 103 provided on the rail 102 of the printer main body 101. Thus, in a case where the sheet feeding tray 30 is about to move in the direction of being pulled out from the printer main body 101, the lock end 37*b* of the sheet feeding tray 30 is caught by the stopper 103 of the printer main body 101, and the sheet feeding tray 30 is brought into the locked state where the sheet feeding tray 30 is prohibited from being pulled out from the printer main body 101.

The tension spring 38 of the lock mechanism biases the lock lever 37 to rotate the lock lever 37 in a direction in which the lock end 37*b* of the lock lever 37 faces the lock position. The lock lever 37 rotates between the lock position and the unlocked position in conjunction with a sliding movement of the handle 31 with respect to the tray member 32.

Figure 8A:
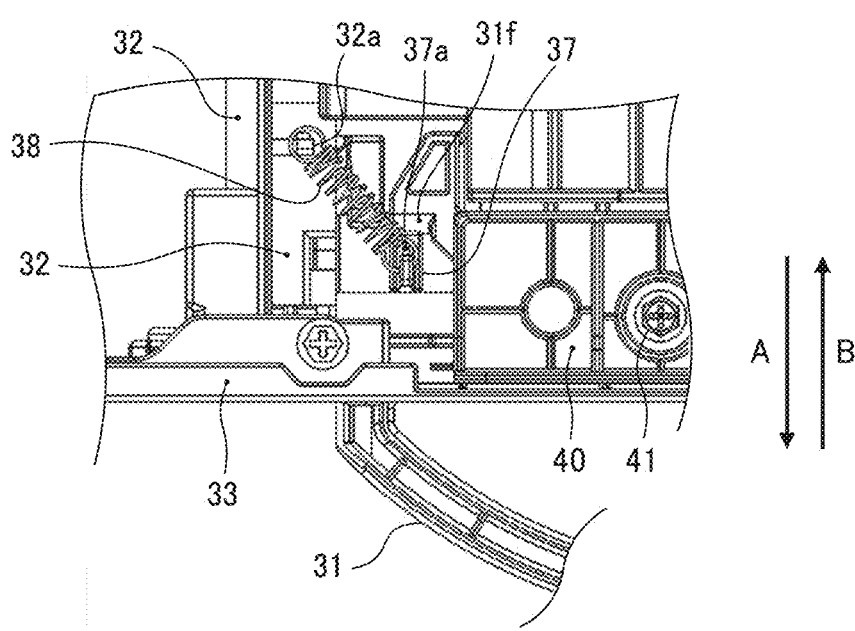
FIG. 8A is a bottom view illustrating a handle at a housing position.
Figure 8B:
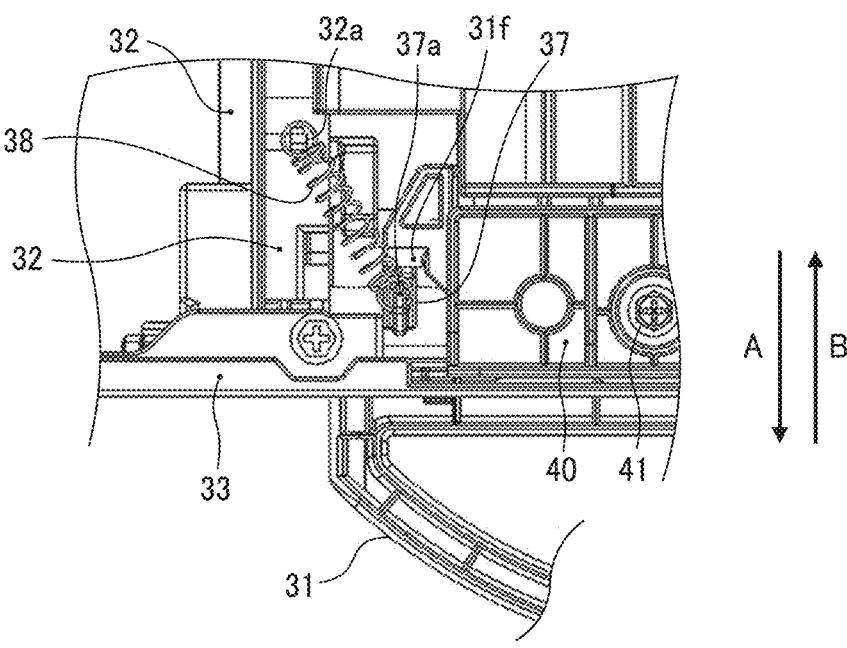
FIG. 8B is a bottom view illustrating the handle at a pull-out position.

FIG. 8A is a bottom view illustrating the handle 31 at a housing position, and FIG. 8B is a bottom view illustrating the handle 31 at a pull-out position.

The handle 31 is mounted to the tray member 32 in a manner of being movable between the housing position illustrated in FIG. 8A and the pull-out position illustrated in FIG. 8B. The handle 31 is provided with an abutment member 31*f* that abuts on the lock lever 37.

When the user operates the handle 31 at the housing position illustrated in FIG. 8A in a handle pull-out direction A (the direction coinciding with the pull-out direction A of the sheet feeding tray 30 in the present embodiment), the handle 31 is pulled out to the pull-out position illustrated in FIG. 8B. Thus, the abutment member 31*f* of the handle 31 rotates the lock lever 37 against the biasing force of the tension spring 38, and the lock end 37*b* of the lock lever 37 moves from the lock position illustrated in FIG. 6A to the unlocked position illustrated in FIG. 6B. Thus, since the lock end 37*b* comes out of the groove 103*a* of the stopper 103 of the printer main body 101, the lock end 37*b* of the sheet feeding tray 30 is not caught by the stopper 103 of the printer main body 101, and the sheet feeding tray 30 is brought into an unlocked state where the sheet feeding tray 30 can be pulled out from the printer main body 101.

Next, a spring mounting structure in the present embodiment will be described.

Figure 9:
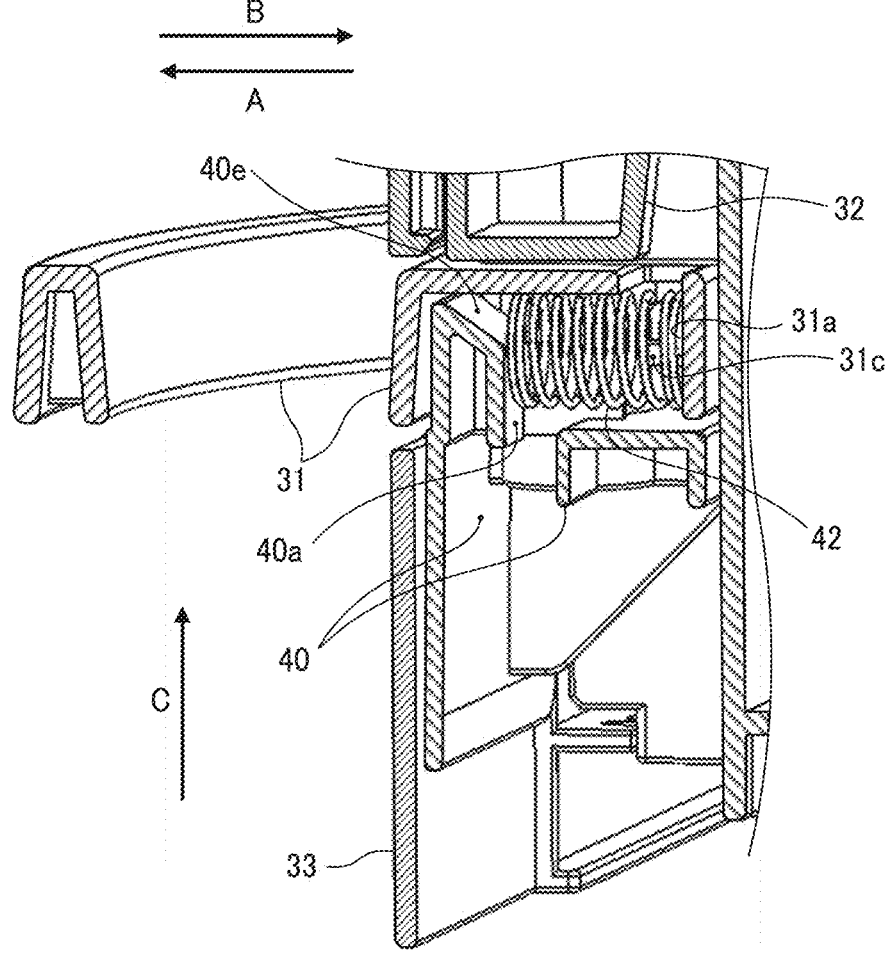
FIG. 9 is a cross-sectional view of the handle and a tray member.

FIG. 9 is a cross-sectional view of the handle 31 and the tray member 32.

Figure 10:
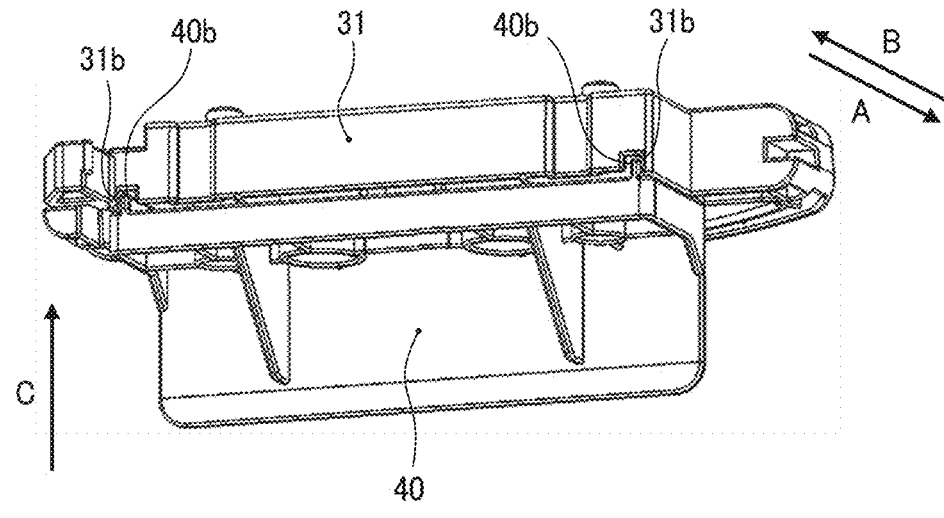
FIG. 10 is a perspective view of a structural body in which the handle and a holder are assembled to each other as viewed from an inner side (back side) of the printer main body.

FIG. 10 is a perspective view of the structural body in which the handle 31 and a holder 40 are assembled to each other as viewed from an inner side (back side) of the printer main body 101. That is, FIG. 10 illustrates a structural body in which the first structural member and the second structural member are assembled.

On the sheet feeding tray 30 of the present embodiment, the holder 40 as a handle holder that holds the handle 31 on the tray member 32 is mounted so that the handle 31 does not come off from the tray member 32 when the handle 31 is mounted to the tray member 32. The holder 40 is disposed in a manner of sandwiching the handle 31 with the tray member 32, and is fixed to the tray member 32 by a screw 41 illustrated in FIGS. 8A and 8B. Therefore, the holder 40 restricts the movement (displacement) of the handle 31 in the up-down direction.

As illustrated in FIG. 10, the holder 40 is provided with protrusions 40*b* and 40*b*, and the protrusions 40*b* and 40*b* enter the recess 31*b* of the handle 31 when the handle 31 and the holder 40 are assembled to each other as illustrated in FIG. 10. Thus, the holder 40 also restricts the movement (displacement) of the handle 31 in the left-right direction.

A compression spring 42 is mounted in a predetermined compressed state between a handle side pressing surface 31*a* (first abutting surface) of the handle 31 as the first structural member and a holder side pressing surface 40*a* of the holder 40 as the second structural member. The compression spring 42 of the present embodiment has a wound spring structure (spring coil structure) in which a wire material is spirally wound, but is not limited thereto.

The compression spring 42 biases the handle side pressing surface 31*a* of the handle 31 in a handle housing direction B with respect to the holder side pressing surface 40*a* of the holder 40 fixed to the tray member 32. Thus, a biasing force toward the handle housing direction B is kept to be applied to the handle 31, and the handle 31 is maintained at the housing position unless the handle 31 is operated in the handle pull-out direction A.

That is, in the present embodiment, when the user operates the handle 31 in the handle pull-out direction A, the handle 31 moves from the housing position illustrated in FIG. 8A to the pull-out position illustrated in FIG. 8B against the biasing force of the compression spring 42. Thus, the lock mechanism is brought into the unlocked state as described above, and the user further operates the handle 31 in the handle pull-out direction A as it is to pull out the sheet feeding tray 30 in the pull-out direction A. On the other hand, when the user releases his/her hand from the handle 31, the handle 31 moves from the pull-out position illustrated in FIG. 8B to the housing position illustrated in FIG. 8A by the biasing force of the compression spring 42.

Figure 11A:
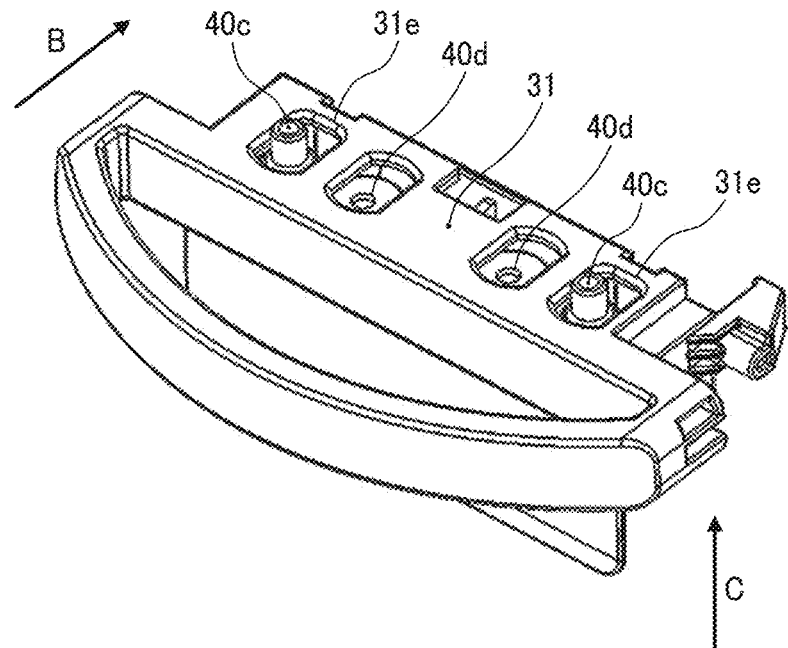
FIG. 11A is a perspective view of the structural body illustrated in FIG. 10 when the handle is at the housing position as viewed from above.
Figure 11B:
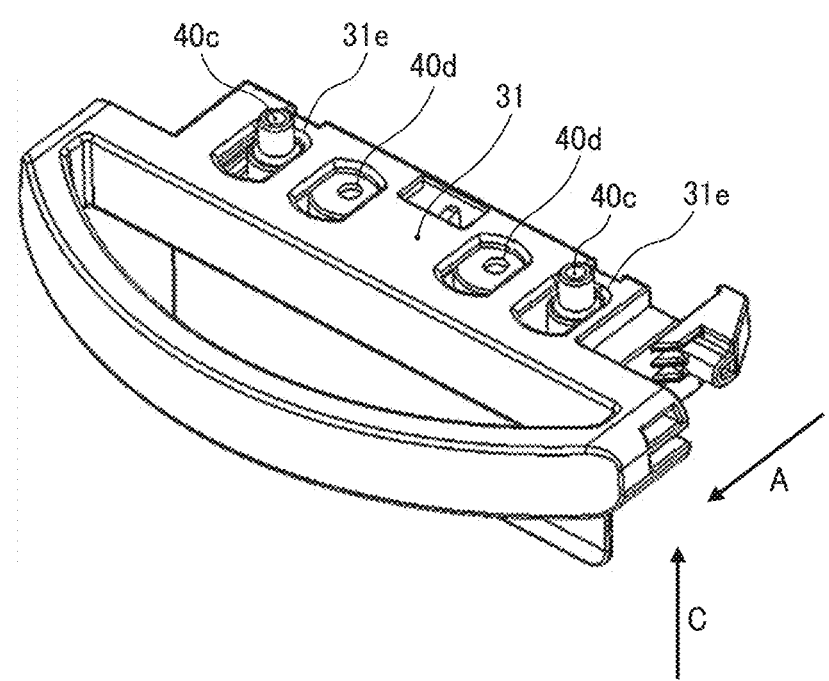
FIG. 11B is a perspective view of the structural body illustrated in FIG. 10 when the handle is at the pull-out position as viewed from above.

FIG. 11A is a perspective view of the structural body illustrated in FIG. 10 when the handle 31 is at the housing position as viewed from above, and FIG. 11B is a perspective view of the structural body illustrated in FIG. 10 when the handle 31 is at the pull-out position as viewed from above.

Holes 40*d* and 40*d* passing through in the up-down direction are formed in the holder 40, and the holder 40 is screwed to the tray member 32 through screws 41 and 41 in the holes 40*d* and 40*d*.

In addition, bosses 40*c* and 40*c* are formed on the upper surface of the holder 40. The bosses 40*c* and 40*c* are inserted into positioning holes of the tray member 32 to position between the holder 40 and the tray member 32. In addition, pull-out restricting members 31*e* and 31*e* which are holes passing through in the up-down direction are provided on the upper surface of the handle 31, and the bosses 40*c* and 40*c* of the holder 40 are also inserted through the pull-out restricting members 31*e* and 31*e*. When the handle 31 is pulled out to the pull-out out position as illustrated in FIG. 11B, the boss 40*c* of the holder 40 abuts on an inner wall of the pull-out restricting member 31*e* of the handle 31, and the handle 31 is restricted to the pull-out position.

As described above, the holder 40 of the present embodiment functions to prevent the handle 31 from coming off and to restrict the position of the handle 31.

Next, a mounting structure and a mounting method of the compression spring 42 in the present embodiment will be described. Here, the spring mounting structure in the present embodiment is a combination of the handle 31 for mounting the compression spring 42 temporarily held by the handle 31 in a predetermined compressed state and a structural portion of the holder 40 as described later.

In order to mount the compression spring 42 between the handle side pressing surface 31a of the handle 31 and the holder side pressing surface 40a of the holder 40, work in a narrow place surrounded by the tray cover 33 and the tray member 32 is required, and thus workability is poor. In addition, since it is generally desired that a spring such as the compression spring 42 is installed at a location that cannot be touched by a user as much as possible, in the present embodiment, the compression spring 42 is covered with the holder 40 so that the user cannot touch the compression spring 42. Therefore, it is difficult to mount the compression spring 42 after assembling the handle 31 and the holder 40.

In the present embodiment, first, the compression spring 42 is temporarily held by the handle 31. Then, the holder 40 is assembled to the handle 31 in a predetermined assembling direction C (a direction from the bottom to the top of the printer main body in the present embodiment) orthogonal to (intersecting) the compression direction of the compression spring 42, and the compression spring 42 is mounted between the handle side pressing surface 31a of the handle 31 and the holder side pressing surface 40a of the holder 40 in a predetermined compressed state. According to this, the mounting of the compression spring 42 can be completed simply by performing the work of temporarily holding the compression spring 42 by the handle 31 and then performing the work of assembling the holder 40 to the handle 31 in the predetermined assembling direction C. Thus, when the compression spring 42 is installed at a location with poor workability as in the present embodiment, the work of mounting the compression spring 42 can also be easily performed.

However, in the work of temporarily holding the compression spring 42 by the handle 31, the work of temporarily holding the compression spring 42 in a compressed state is troublesome for the operator. Specifically, for example, when the compression spring 42 is brought into a compressed state, the compression spring 42 may be restored and the compression spring 42 may be blown away from the hand of the operator, or when the compression spring 42 brought into the compressed state is mounted to the handle 31, the compression spring 42 may be restored and the mounting may not be performed well, which may be troublesome.

Therefore, in the spring mounting structure of the present embodiment, the compression spring 42 is temporarily held in an uncompressed state by the handle 31. According to this, the troublesome work of compressing the compression spring 42 at the time of temporary holding the compression spring 42 on the handle 31 is eliminated.

Figure 12A:
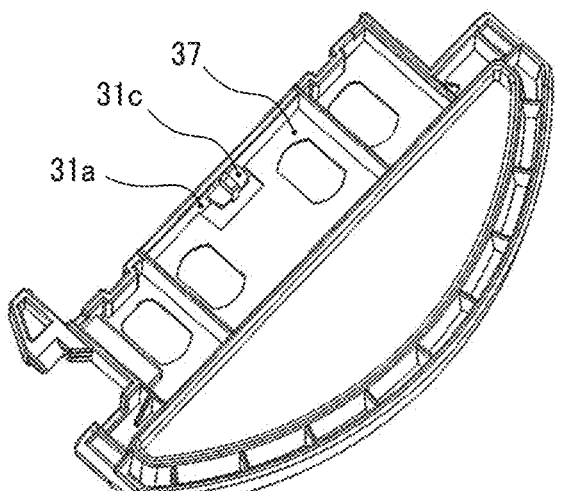
FIG. 12A is a perspective view of the handle before a compression spring is temporarily held as viewed from below.
Figure 12B:
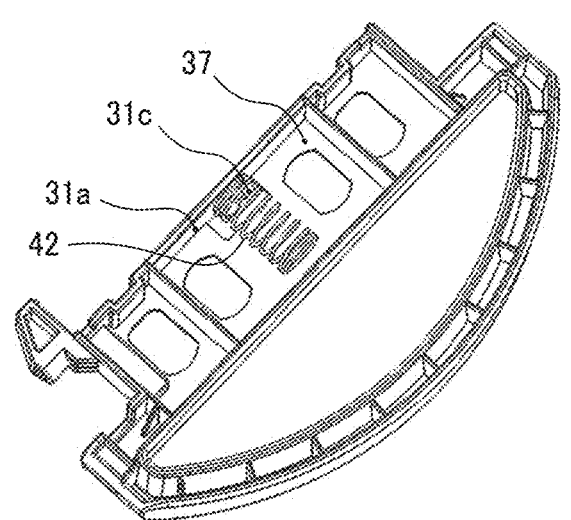
FIG. 12B is a perspective view of the handle in a state where the compression spring is temporarily held as viewed from below.

FIG. 12A is a perspective view of the handle 31 before the compression spring 42 is temporarily held as viewed from below, and FIG. 12B is a perspective view of the handle 31 in a state where the compression spring 42 is temporarily held as viewed from below.

As illustrated in FIG. 12A, the handle 31 is provided with a spring mounting boss 31c constituting a temporary holding portion on the handle side pressing surface 31a of the compression spring 42. When temporarily holding the compression spring 42, the operator fits one end of the compression spring 42 in the uncompressed state into the boss 31c. Thus, as illustrated in FIG. 12B, in a state where one end of the compression spring 42 is in contact with the handle side pressing surface 31a of the handle 31, the compression spring 42 is temporarily held by the handle 31 in an uncompressed state.

In particular, the boss 31c of the present embodiment has an outer diameter slightly greater than an inner diameter of one end of the compression spring. Therefore, the inner diameter of one end of the compression spring 42 is slightly expanded and fitted into the boss 31c, and the boss 31c is clamped by a restoring force of the compression spring 42 against the expansion, and the temporary holding is stably maintained. According to such a configuration, the operator can temporarily hold the compression spring 42 in the uncompressed state by the handle 31 simply by performing a simple operation of lightly press-fitting the compression spring 42.

Figure 13A:
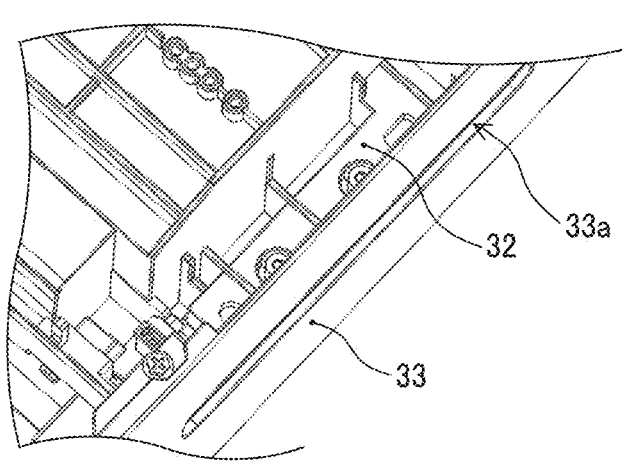
FIG. 13A is a perspective view of the tray member before the handle is assembled as viewed from below.

FIG. 13A is a perspective view of the tray member 32 before the handle 31 is assembled as viewed from below.

Figure 13B:
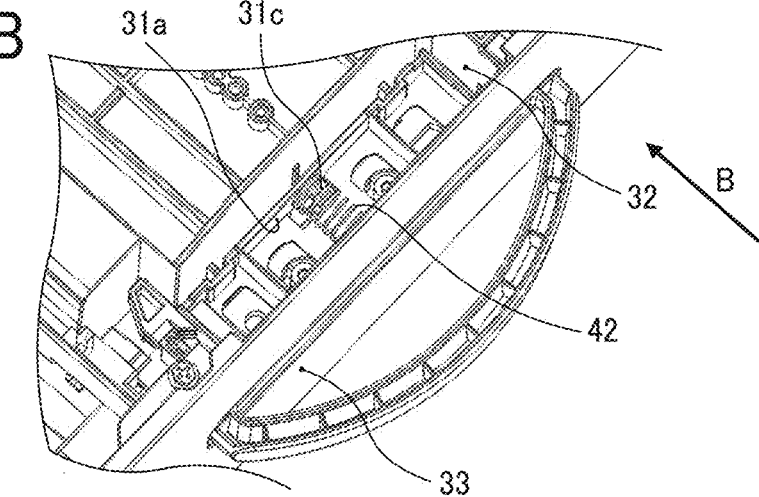
FIG. 13B is a perspective view of the tray member in a state where the handle is inserted (unassembled state) as viewed from below.

FIG. 13B is a perspective view of the tray member 32 in a state where the handle 31 is inserted (unassembled state) as viewed from below.

Figure 13C:
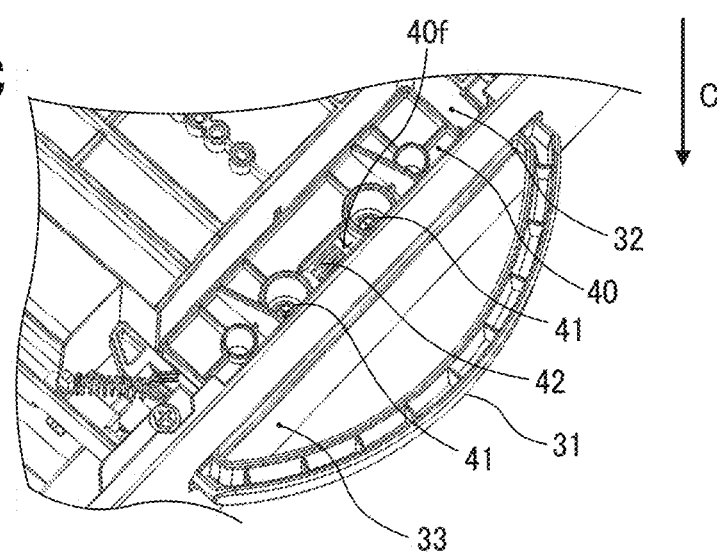
FIG. 13C is a perspective view of a state where the holder is assembled to the handle and the assembly of the handle to the tray member is completed as viewed from below.

FIG. 13C is a perspective view of a state where the holder 40 is assembled to the handle 31 and the assembly of the handle 31 with respect to the tray member 32 is completed as viewed from below.

First, as illustrated in FIG. 13A, the tray cover 33 is assembled to the tray member 32. Then, the handle 31 in a state where the compression spring 42 is temporarily held as illustrated in FIG. 12B is inserted into the tray member 32 from a hole 33a of the tray cover 33 as illustrated in FIG. 13B. Thereafter, as illustrated in FIG. 13C, the holder 40 is assembled to the handle 31 inserted into the tray member 32 in the predetermined assembling direction C.

Note that the predetermined assembling direction C in the present embodiment corresponds to the direction from the bottom to the top of the printer main body 101. However, at the time of assembling the holder 40, it is preferable that the tray member 32 is in an upside down posture and the holder 40 is assembled from the top to the bottom toward the tray member 32, which is excellent in workability.

Figure 14A:
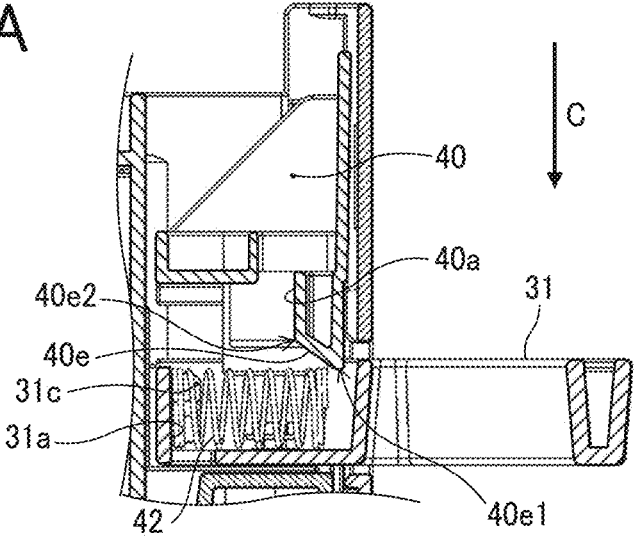
FIGS. 14A to 14C are cross-sectional views illustrating a movement when the holder is inserted and assembled along a predetermined assembling direction C from the top to the bottom toward the tray member in an upside down posture and the compression spring is mounted.
Figure 14B:
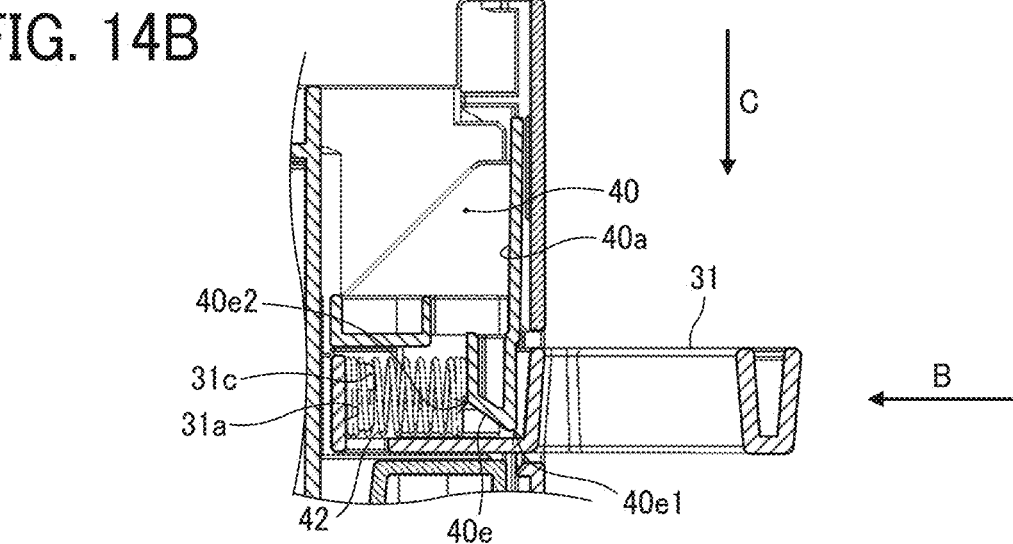
Figure 14C:
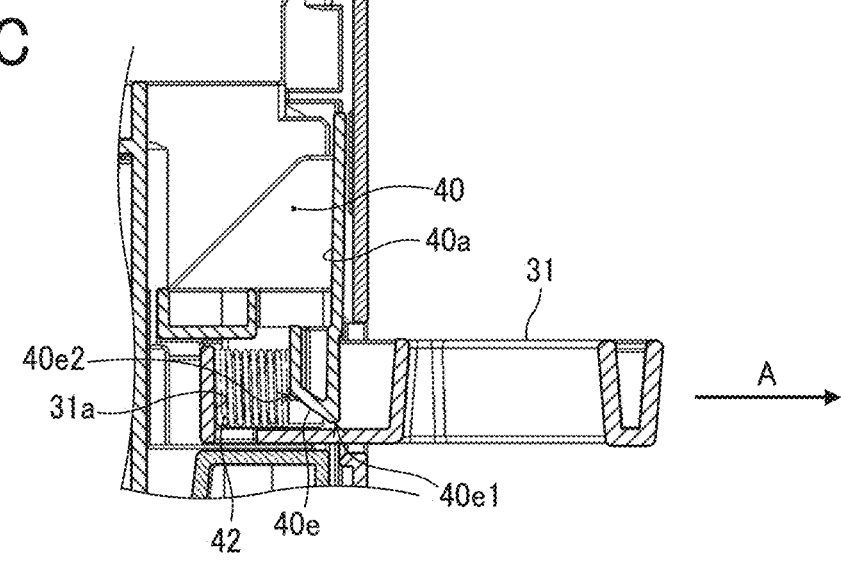

FIGS. 14A to 14C are cross-sectional views illustrating the movement when the holder 40 is inserted and assembled along the predetermined assembling direction C from the top to the bottom toward the tray member 32 in the upside down posture and the compression spring 42 is mounted.

The holder 40 is provided with the holder side pressing surface 40a on which the other end of the compression spring abutting on the handle side pressing surface 31a of the handle 31 abuts when the mounting of the compression spring 42 is completed. The holder 40 is provided with a tapered surface 40e that guides the other end of the compression spring 42 in the uncompressed state temporarily held by the handle 31 to the holder side pressing surface 40a at the time of assembling the holder 40 in the predetermined assembling direction C.

As illustrated in FIG. 14A, an end side 40e1 of the tapered surface 40e located on the front side in the predetermined assembling direction C is located on the outer side in the compression direction with respect to the other end (the other end of the free length of the compression spring 42) of the compression spring 42 in the uncompressed state temporarily held by the handle 31, and is disposed at a position where the other end of the compression spring 42 in the uncompressed state is in contact with the tapered surface 40e during the assembling in the predetermined assembling direction C. Thus, when the holder 40 is moved along the predetermined assembling direction C, the tapered surface 40e of the holder 40 comes into contact with the other end of the compression spring 42 in the uncompressed state temporarily held by the handle 31, and then the other end of the compression spring 42 moves to the holder side pressing surface 40a along the tapered surface 40e, and the compression spring 42 is gradually compressed until being pressed by the tapered surface 40e to reach a predetermined compressed state. As a result, when the assembly is completed, the compression spring 42 is mounted between the handle side pressing surface 31a of the handle 31 and the holder side pressing surface 40a of the holder 40 in the predetermined compressed state as illustrated in FIG. 14B.

By fixing the holder 40 to the tray member 32 with the screw 41, as illustrated in FIG. 14B, the biasing force in the handle housing direction B is kept to be applied to the handle 31 by the compression spring 42, and the handle 31 is maintained at the housing position unless the handle 31 is operated in the handle pull-out direction A. On the other hand, when the user operates the handle 31 in the handle pull-out direction A, the handle 31 is pulled out to the pull-out position against the biasing force of the compression spring 42 as illustrated in FIG. 14C.

Figure 15:
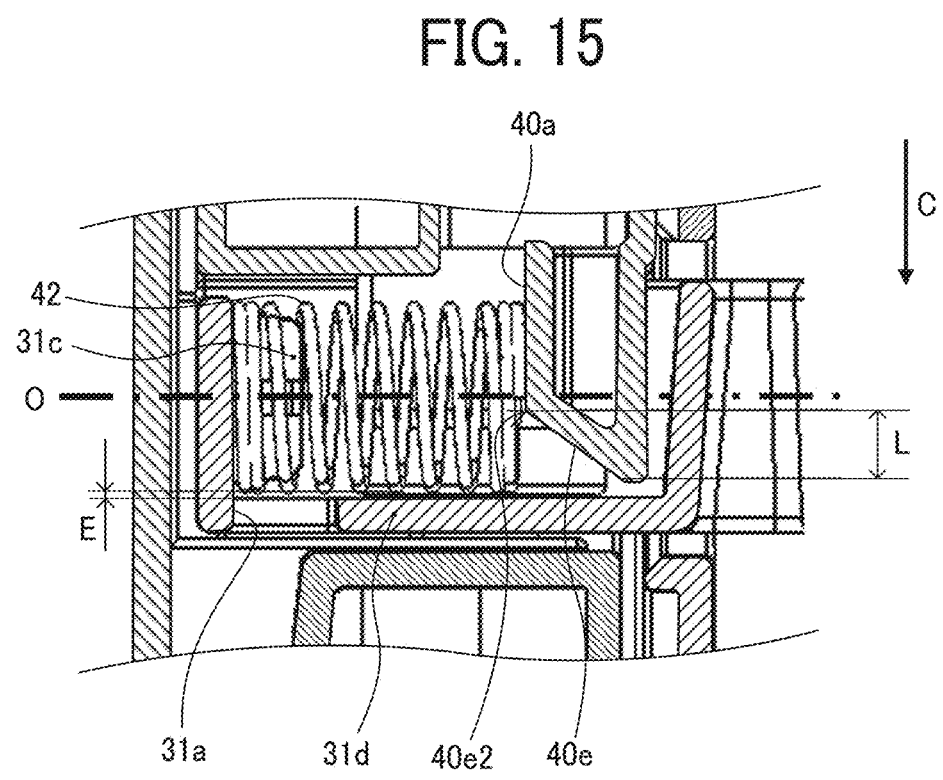
FIG. 15 is an explanatory diagram illustrating a positional relationship between the compression spring and the holder side pressing surface and the tapered surface of the holder when the assembly is completed.

FIG. 15 is an explanatory diagram illustrating a positional relationship between the compression spring 42 and the holder side pressing surface 40a and the tapered surface 40e of the holder 40 when the assembly is completed.

In the present embodiment, as illustrated in FIG. 15, a boundary position 40e2 between the tapered surface 40e and the holder side pressing surface 40a passes through a central axis O of the compression spring 42 from the start of assembly to the completion of assembly. According to this, at the time of completion of assembly, more than half of the other end surface of the compression spring 42 can abut on the holder side pressing surface 40a, and the posture of the compression spring 42 can be suppressed from collapsing due to falling of the compression spring 42 to the tapered surface 40e side or the like.

In the present embodiment, as illustrated in FIG. 15, a deformation restricting member 31d serving as a deformation restrictor that restricts deformation of the compression spring 42 in a direction orthogonal to the compression direction (direction of the assembling direction C) at the time of assembling the compression spring 42 in the predetermined assembling direction C is provided on the handle 31. As a result, in a case where the other end of the compression spring 42 temporarily held by the handle 31 is pushed in the direction of the assembling direction C by the tapered surface 40e, the side surface of the compression spring 42 can also abut on the deformation restricting member 31d, and deformation such as bending or buckling of the compression spring 42 can also be suppressed. Therefore, the compression spring 42 can be mounted in an appropriate posture between the handle side pressing surface 31a of the handle 31 and the holder side pressing surface 40a of the holder 40.

In particular, it is preferable that a gap E between the compression spring 42 temporarily held by the handle 31 and the deformation restricting member 31d is as small as possible in terms of restricting deformation. Specifically, it is preferable that the gap E is narrower than a length L of the tapered surface 40e in the assembling direction C.

Figure 16A:
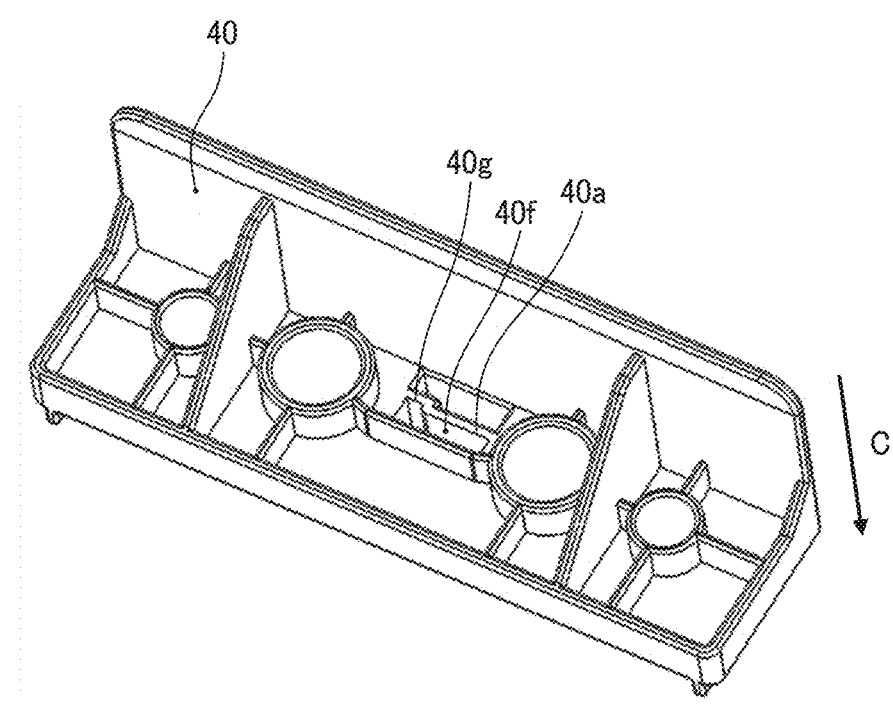
FIG. 16A is a perspective view of the holder as viewed from above.
Figure 16B:
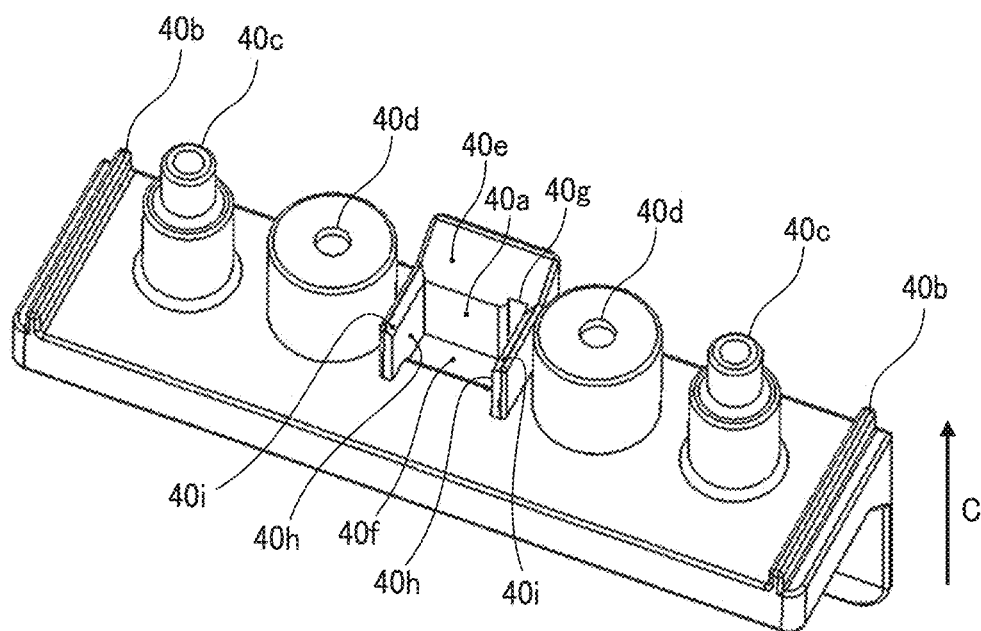
FIG. 16B is a perspective view of the holder as viewed from below.

FIG. 16A is a perspective view of the holder 40 as viewed from above, and FIG. 16B is a perspective view of the holder 40 as viewed from below.

The holder 40 of the present embodiment is provided with restricting walls 40h and 40h serving as a movement restrictor that restrict the other end of the compression spring 42 from moving out of a predetermined position on the holder side pressing surface 40a. The restricting walls 40h and 40h are disposed to sandwich the holder side pressing surface 40a in a direction orthogonal to the predetermined assembling direction C, and when the other end of the compression spring 42 moves out of the predetermined position on the holder side pressing surface 40a at the time of assembling, a side portion of the compression spring 42 abuts on the restricting walls 40h and 40h, and the movement is restricted.

On the restricting walls 40h and 40h of the present embodiment, guiding tapered surfaces 40i and 40i are formed at contact ends (the upper ends in FIG. 16B) that come into contact with the other end of the compression spring 42 when the other end moves from the tapered surface 40e to the holder side pressing surface 40a. The guiding tapered surfaces 40i and 40i function as guide surfaces that guide the other end of the compression spring 42 toward the predetermined position on the holder side pressing surface 40a. Therefore, in a case where the position of the other end of the compression spring 42 is displaced and the other end of the compression spring 42 comes into contact with the contact ends of the restricting walls 40h and 40h when moving from the tapered surface 40e to the holder side pressing surface 40a, the other end of the compression spring 42 also moves along the guiding tapered surfaces 40i and 40i and is returned to the position between the restricting walls 40h and 40h, and is guided to the predetermined position on the holder side pressing surface 40a.

In addition, since the compression spring 42 of the present embodiment has a wound spring structure in which the wire is spirally wound, a wire end surface (end surface substantially orthogonal to the axial direction of the wire) 42a located at the other end of the compression spring 42 faces the side of the compression spring 42. Therefore, depending on the rotational position about the central axis O taken by the compression spring 42, the wire end surface 42a located at the other end of the compression spring 42 may face forward in the moving direction (here, forward in the assembling direction C) when the other end of the compression spring 42 moves from the tapered surface 40e to the holder side pressing surface 40a during the assembling. In this case, the wire end surface 42a of the compression spring 42 is caught by the holder side pressing surface 40a, so that the position of the compression spring 42 is displaced or the posture of the compression spring 42 is lost, and thus, the compression spring 42 may fail to be appropriately mounted.

Figure 17A:
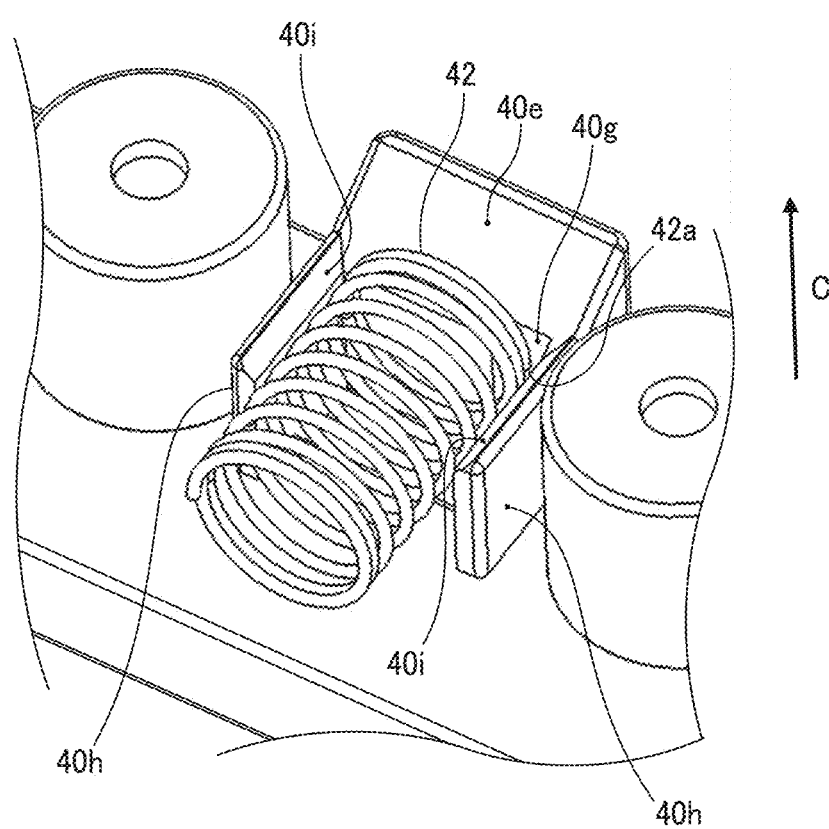
FIG. 17A is an enlarged perspective view of a portion where the other end of the compression spring abuts on the holder side pressing surface of the holder.
Figure 17B:
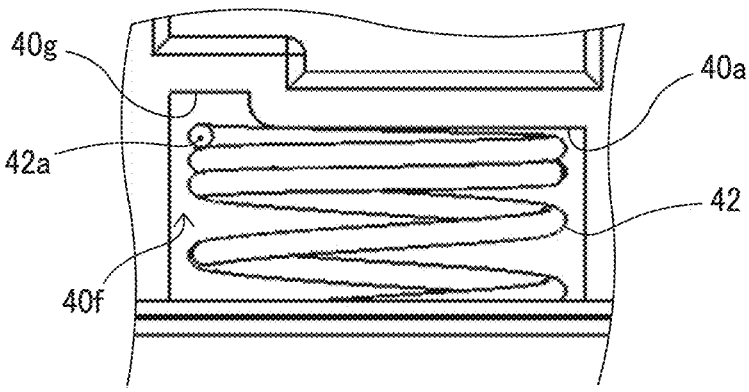
FIG. 17B is an explanatory diagram illustrating the compression spring visible from a viewing window provided in the holder.

Therefore, in the present embodiment, as illustrated in FIGS. 17A and 17B, when the wire end surface 42a of the compression spring 42 faces forward in the assembling direction C, a groove 40g is formed at a location where the wire end surface 42a passes. Thus, in the case as described above, since the wire end surface 42a of the compression spring 42 enters the groove 40g, the wire end surface 42a of the compression spring 42 is not caught by the holder side pressing surface 40a, and the compression spring 42 can be appropriately mounted.

In addition, as illustrated in FIGS. 16A and 16B, the holder 40 of the present embodiment is provided with a viewing window 40f which is a through hole for visually recognizing the compression spring 42 after completion of assembly from the outside. Without the viewing window 40f, the compression spring 42 cannot be visually recognized after the holder 40 is assembled and it is difficult to confirm whether the compression spring 42 is appropriately mounted in this manner. By providing the viewing window 40f as in the present embodiment, it is easy to confirm whether the compression spring 42 is appropriately mounted, whether the compression spring 42 is missing, and the like after the holder 40 is assembled.

In particular, as illustrated in FIG. 17B, the viewing window 40f of the present embodiment is provided in a manner that a contact portion between the other end of the compression spring 42 and the holder side pressing surface 40a can be visually recognized, and thus, it is possible to visually recognize the state of the other end of the compression spring 42 abutting on the holder side pressing surface 40a after assembly. According to this, since the state of the other end of the compression spring 42, which is particularly important for checking the mounted state of the compression spring 42, can be visually recognized, it is easy to accurately determine whether the compression spring 42 is appropriately mounted.

Figure 18:
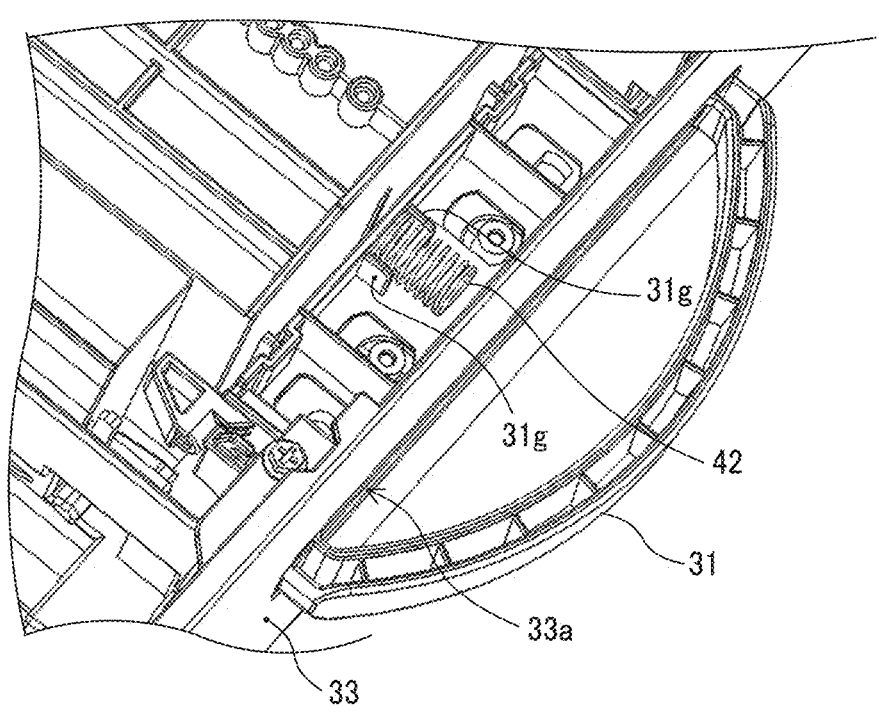
FIG. 18 is a perspective view of the tray member in a state where the handle is inserted (unassembled state), as viewed from below, in one modification of a temporary holding portion of the handle.

In the present embodiment, the temporary holding of the compression spring 42 to the handle 31 is performed by light press fitting of the handle 31 to the boss 31c of the handle 31, but embodiments of the present disclosure are not limited to this example. For example, as illustrated in FIG. 18, instead of the boss 31c, temporary holding restricting walls 31g and 31g that restrict the position of one end of the compression spring 42 from the side (in the left-right direction) of the compression spring 42 may be provided. In this case, as in the embodiment described above, a procedure of causing the handle 31 to temporarily hold the compression spring 42 and then inserting the handle 31 into the hole 33a of the tray cover 33 may be used, or another procedure may be used. For example, after the handle 31 is inserted into the hole 33a of the tray cover 33, the procedure of causing the handle 31 to temporarily hold the compression spring 42 may be used.

Further, as described above, a spring mounting structure according to an embodiment of the present disclosure is applicable not only to the sheet feeding tray 30 but also to other devices mounted on the image forming apparatus. For example, an embodiment of the present disclosure is also applicable to a waste toner container mounted on an image forming apparatus.

Figure 19A:
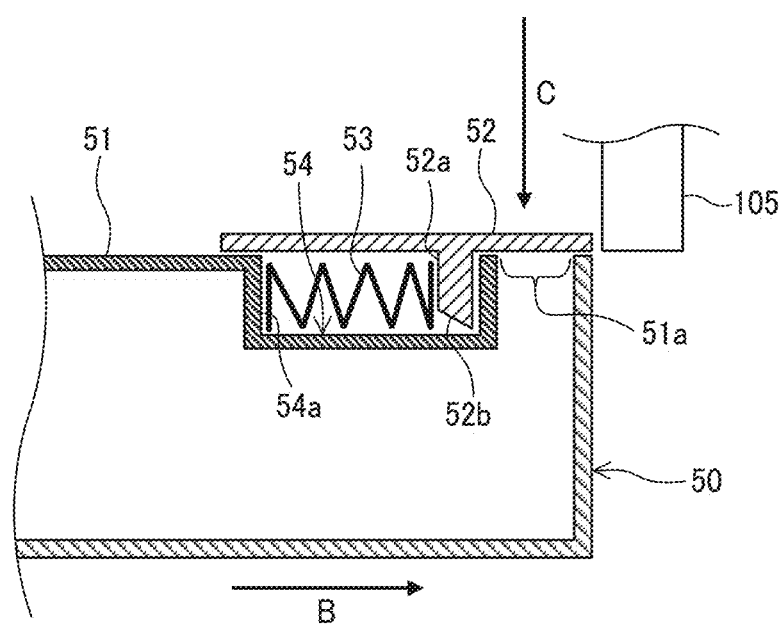
FIG. 19A is a schematic diagram illustrating a state where a waste toner container is pulled out from a main body of an image forming apparatus in one example of the waste toner container to which a spring mounting structure according to an embodiment of the present disclosure is applied.
Figure 19B:
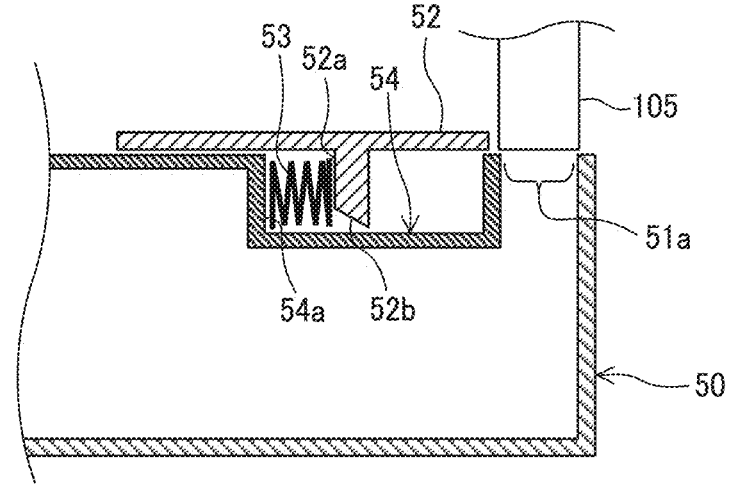
FIG. 19B is a schematic diagram illustrating a state where the waste toner container is housed in the main body of the image forming apparatus in the example.

FIGS. 19A and 19B are schematic diagrams illustrating an example of a waste toner container 50 to which a spring mounting structure according to an embodiment of the present disclosure is applied.

The waste toner container 50 includes a waste toner box 51 as a waste toner storage that stores a waste toner, a shutter 52 serving as an opening-and-closing member that opens and closes a waste toner receiving port 51a of the waste toner box 51, a compression spring 53 that biases the shutter 52 from an open position to a closed position, and a spring mounting portion 54 that is provided in the waste toner box 51 and to which the compression spring 53 is mounted.

When the waste toner container 50 has been pulled out from the main body of the image forming apparatus, as illustrated in FIG. 19A, the shutter 52 is positioned at the closed position by the biasing force of the compression spring 53 so that the toner in the waste toner box 51 does not leak from the waste toner receiving port 51a. On the other hand, when the waste toner container 50 has been housed in the main body of the image forming apparatus, as illustrated in FIG. 19B, the shutter 52 is positioned at the open position so that the waste toner receiving port 51a of the waste toner box 51 communicates with a waste toner discharge port 105 of the main body of the image forming apparatus.

Specifically, while the waste toner container 50 is being housed along the housing direction B toward the main body of the image forming apparatus, the shutter 52 of the waste toner container 50 abuts on the waste toner discharge port 105 of the main body of the image forming apparatus, thereby restricting the movement of the shutter 52 in the housing direction B. As the waste toner box 51 further moves in the housing direction B in this state, the shutter 52 moves relative to the waste toner box 51, and the shutter 52 is positioned at the open position. As a result, when the waste toner container 50 is housed in the main body of the image forming apparatus, the waste toner receiving port 51a of the waste toner box 51 and the waste toner discharge port 105 of the main body of the image forming apparatus communicate with each other.

Also in the waste toner container 50, the spring mounting portion 54 functions as the first structural member, and the shutter 52 functions as the second structural member, thereby implementing a spring mounting structure similar to that of the above-described embodiment. That is, also in the waste toner container 50, when the shutter 52 is assembled to the spring mounting portion 54 in the predetermined assembling direction C intersecting the compression direction of the compression spring 53, the other end of the compression spring 53 temporarily held in a spring housing space member (temporary holding portion) of the spring mounting portion 54 is guided to a shutter side pressing surface 52a which is the second abutting surface of the shutter 52 by a tapered surface 52b of the shutter 52. At this time, also in the present example, the compression spring 53 temporarily held by the temporary holding portion of the spring mounting portion 54 is in an uncompressed state. Therefore, the troublesome work of compressing the compression spring 53 becomes unnecessary at the time of temporary holding the compression spring 53 to the temporary holding portion of the spring mounting portion 54. Also in the present example, the other end of the compression spring 53 in the uncompressed state temporarily held by the temporary holding portion of the spring mounting portion 54 is in contact with the tapered surface 52b from the start of assembly to the completion of assembly in the predetermined assembling direction C, and then the other end moves along the tapered surface 52b to the shutter side pressing surface 52a and is gradually compressed until the compression spring 53 comes into the predetermined compressed state. As a result, when the assembly is completed, the compression spring 53 is mounted in the predetermined compressed state between a box side pressing surface 54a which is the first abutting surface of the spring mounting portion 54 and the shutter side pressing surface 52a of the shutter 52.

The embodiments described above are just examples, and the various aspects of the present disclosure attain respective effects as follows.

First Aspect

According to a first aspect, a spring mounting structure is for mounting a compression spring temporarily held by a temporary holding portion (e.g., the boss 31c or the spring housing space member) of a first structural member (e.g., the handle 31 or the spring mounting portion 54) in a predetermined compressed state between a first abutting surface (e.g., the handle side pressing surface 31a or the box side pressing surface 54a) and a second abutting surface (e.g., the holder side pressing surface 40a or the shutter side pressing surface 52a) in a structural body in which the first structural member including the first abutting surface abutting on one end of the compression spring (e.g., the compression spring 42 or the compression spring 53) and a second structural member (e.g., the holder 40 or the shutter 52) including the second abutting surface abutting on the other end of the compression spring are assembled in a predetermined assembling direction (e.g., the assembling direction C) intersecting a compression direction of the compression spring. The temporary holding portion of the first structural member temporarily holding the compression spring in an uncompressed state, and the second structural member has a tapered surface (e.g., the tapered surface 40*e* or the tapered surface 52*b*) to guide the other end of the compression spring in the uncompressed state temporarily held by the temporary holding portion to the second abutting surface when the second structural member is assembled in the predetermined assembling direction.

In the present aspect, when the first structural member and the second structural member are assembled in the predetermined assembling direction intersecting the compression direction of the compression springs, the other end of the compression spring temporarily held by the temporary holding portion of the first structural member is guided to the second abutting surface of the second structural member by the tapered surface of the second structural member. At this time, in the present aspect, the compression spring temporarily held by the temporary holding portion of the first structural member is in an uncompressed state. Therefore, when the operation of temporary holding the compression spring to the temporary holding portion of the first structural member is performed, the troublesome work of compressing the compression spring, which is necessary in the conventional spring mounting structure, is unnecessary. According to the present aspect, the other end of the compression spring in the uncompressed state temporarily held by the temporary holding portion comes into contact with the tapered surface from the start of assembly to the completion of assembly in the predetermined assembling direction, and then the other end moves to the second abutting surface along the tapered surface and the compression spring is gradually compressed until reaching the predetermined compressed state. As a result, when the assembly is completed, the compression spring is mounted between the first abutting surface and the second abutting surface in the predetermined compressed state.

As described above, according to the present aspect, in the spring mounting structure in which the other end of the compression spring temporarily held by the temporary holding portion of the first structural member is guided to the second abutting surface of the second structural member by the tapered surface of the second structural member when the first structural member and the second structural member are assembled in the predetermined assembling direction, the troublesome work of compressing the compression spring is unnecessary during the temporary holding operation of the compression spring.

Second Aspect

According to a second aspect, the spring mounting structure of the first aspect further includes a deformation restrictor (e.g., the deformation restricting member 31*d*) to restrict the compression spring from deforming in a direction orthogonal to the compression direction when the second structural member is assembled in the predetermined assembling direction.

Such a configuration facilitates the compression spring to be mounted in an appropriate posture between the first abutting surface of the first structural member and the second abutting surface of the second structural member.

Third Aspect

According to a third aspect, the spring mounting structure of the first or second aspect further includes a movement restrictor (e.g., the restricting walls 40*h* and 40*h*) to restrict the other end of the compression spring from moving out of a predetermined position on the second abutting surface.

Such a configuration facilitates the compression spring to be mounted at an appropriate position between the first abutting surface of the first structural member and the second abutting surface of the second structural member.

Fourth Aspect

According to a fourth aspect, in the spring mounting structure of the third aspect, the movement restrictor has a contact end to contact the other end of the compression spring when the other end moves from the tapered surface to the second abutting surface. The contact end has a guide surface (e.g., the guiding tapered surfaces 40*i* and 40*i*) to guide the other end of the compression spring toward the predetermined position.

Such a configuration facilitates the compression spring to be mounted at an appropriate position between the first abutting surface of the first structural member and the second abutting surface of the second structural member.

Fifth Aspect

According to a fifth aspect, in the spring mounting structure of any one of the first to fourth aspects, the compression spring is a winding spring in which a wire is spirally wound, and the second abutting surface has a groove (e.g., the groove 40*g*) at a portion that a wire end surface (e.g., the wire end surface 42*a*) located at the other end of the compression spring passes when the wire end surface faces forward in a moving direction when the other end of the compression spring moves from the tapered surface to the second abutting surface.

According to the fifth aspect, the wire end surface of the compression spring does not enter the groove, and the wire end surface of the compression spring is not caught by the second abutting surface, and thus, the compression spring can be appropriately mounted.

Sixth Aspect

According to a sixth aspect, in the spring mounting structure of any one of the first to fifth aspects, a boundary position (e.g., the boundary position 40*e*2) between the tapered surface and the second abutting surface passes through a central axis (e.g., the central axis O) of the compression spring from the start of assembly to the completion of assembly.

According to this, at the time of completion of assembly, more than half of the other end surface of the compression spring can abut on the second abutting surface, and the posture of the compression spring can be prevented from collapsing due to falling of the compression spring toward the tapered surface or the like.

Seventh Aspect

According to a seventh aspect, in the spring mounting structure of any one of the first to sixth aspects, the compression spring is a winding spring in which a wire is spirally wound, and the temporary holding portion is a boss (e.g., the boss 31c) to insert into the compression spring from the one end of the compression spring. The boss has an outer diameter greater than an inner diameter of the one end of the compression spring.

According to this, simply performing a simple operation of lightly press-fitting the compression springs allows the compression spring to be temporarily held in the uncompressed state by the temporary holding portion of the first structural member.

Eighth Aspect

According to an eighth aspect, in the spring mounting structure of any one of the first to seventh aspects, the first structural member or the second structural member has a viewing window (e.g., the viewing window 40f) to visually recognize the compression springs from the outside after the completion of assembly.

According to this, it is easy to confirm, for example, whether the compression spring is appropriately mounted after the assembly and whether the compression spring is not missing.

Ninth Aspect

According to a ninth aspect, in the spring mounting structure of the eighth aspect, the viewing window is disposed in a manner that a contact portion between the other end of the compression spring and the second abutting surface can be visually recognized.

According to this, since the state of the other end of the compression spring, which is particularly important for checking the mounted state of the compression spring, can be visually recognized, it is easy to accurately determine whether the compression spring is appropriately mounted.

Tenth Aspect

According to a tenth aspect, a sheet housing device (e.g., the sheet feeding tray 30) includes: a sheet housing (e.g., the tray member 32) that houses a sheet (e.g., the sheet P); a handle (e.g., the handle 31) that is mounted to the sheet housing with the handle being movable between a housing position and a pull-out position; a compression spring (e.g., the compression spring 42) that biases the handle from the pull-out position toward the housing position; and a handle holder (e.g., the holder 40) that holds the handle mounted to the sheet housing in the sheet housing. The sheet housing device has the spring mounting structure of any one of the first to ninth aspects. The handle is the first structural member, and the handle holder is the second structural member.

According to the present aspect, it is possible to provide the sheet housing device that eliminates the troublesome work of compressing the compression spring during the temporary holding work of the compression spring.

Eleventh Aspect

According to an eleventh aspect, a waste toner container (e.g., the waste toner container 50) includes: a waste toner storage (e.g., the waste toner box 51) to store a waste toner; an opening-and-closing member (e.g., the shutter 52) to open and close a waste toner receiving port (e.g., the waste toner receiving port 51a) of the waste toner storage; a compression spring (e.g., the compression spring 53) that biases the opening-and-closing member from an open position to a closed position; and a spring mounting portion (e.g., the spring mounting portion 54) that is provided in the waste toner storage and to which the compression spring is mounted. The waste toner container has the spring mounting structure of any one of the first to ninth aspects. The spring mounting portion is the first structural member, and the opening-and-closing member is the second structural member.

According to the present aspect, it is possible to provide the waste toner container that eliminates the troublesome work of compressing the compression spring during the temporary holding work of the compression spring.

Twelfth Aspect

According to a twelfth aspect, an image forming apparatus includes the spring mounting structure of any one of the first to ninth aspects.

According to the present aspect, it is possible to provide the image forming apparatus that eliminates the troublesome work of compressing the compression spring during the temporary holding work of the compression spring.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A spring mounting structure, comprising:
   a first structural member including,
       a first abutting surface configured to abut on a first end of a compression spring; and
       a protruding structure configured to receive the compression spring and temporarily hold the compression spring in an uncompressed state; and
   a second structural member including,
       a second abutting surface configured to abut on a second end of the compression spring; and
       a tapered surface, wherein
         the first structural member is configured to receive the second structural member at least partially within the first structural member in a first assembling direction and thereby assemble the second structural member and the first structural member,
         the first assembling direction intersects a compression direction of the compression spring, and
         in response to the first structural member and the second structural member being assembled, the tapered surface is configured to guide the second end of the compression spring in the uncompressed state temporarily held by the protruding structure to the second abutting surface such that the compression spring temporarily held by the protruding structure is in a compressed state between the first abutting surface and the second abutting surface.

2. The spring mounting structure according to claim 1, further comprising:
   wherein the first structural member is further configured to limit deformation of the compression spring in a direction orthogonal to the compression direction in response to the second structural member and the first structural member being assembled in the first assembling direction.

3. The spring mounting structure according to claim 1, further comprising:

restricting walls configured to restrict the second end of the compression spring from moving out of a first position on the second abutting surface.

4. The spring mounting structure according to claim 3, wherein the each restricting wall has a contact end configured to contact the second end of the compression spring in response to the second end moving from the tapered surface to the second abutting surface, and the contact end has a guide surface configured to guide the second end of the compression spring toward the first position.

5. The spring mounting structure according to claim 1, wherein a boundary position between the tapered surface and the second abutting surface passes through a central axis of the compression spring from a start of assembly of the second structural member and the first structural member to a completion of the assembly.

6. The spring mounting structure according to claim 1, wherein the compression spring has a winding spring structure in which a wire is spirally wound, and the protruding structure is a boss that is configured to receive the compression spring, the boss being configured to be inserted into the compression spring from the first end of the compression spring, and the boss having an outer diameter greater than an inner diameter of the first end of the compression spring.

7. A sheet housing device, comprising:

a sheet housing configured to house a sheet;

a handle mounted to the sheet housing, with the handle being movable between a housing position and a pull-out position;

the spring mounting structure according to claim 1;

the compression spring configured to bias the handle from the pull-out position toward the housing position; and a handle holder configured to hold the handle mounted to the sheet housing in the sheet housing, wherein the handle is the first structural member, and the handle holder is the second structural member.

8. An image forming apparatus, comprising the spring mounting structure according to claim 1.

9. The spring mounting structure according to claim 1, wherein the protruding structure includes a wall facing an outer face of the compression spring.

10. The spring mounting structure according to claim 1, wherein the protruding structure includes a boss facing an inner surface of the compression spring.

11. A spring mounting structure, comprising:

a first structural member including, a first abutting surface configured to abut on a first end of a compression spring; and a protruding structure configured to receive the compression spring and temporarily hold the compression spring in an uncompressed state; and a second structural member including, a second abutting surface configured to abut on a second end of the compression spring; and a tapered surface, wherein in response to the second structural member being assembled in a first assembling direction that intersects a compression direction of the compression spring, the tapered surface is configured to guide the second end of the compression spring in the uncompressed state temporarily held by the protruding structure to the second abutting surface such that the compression spring temporarily held by the protruding structure is in a compressed state between the first abutting surface and the second abutting surface, the compression spring has a winding spring structure in which a wire is spirally wound, and the second abutting surface has a groove at a portion that a wire end surface of the second end of the compression spring passes in response to the wire end surface facing forward in a moving direction in which the second end of the compression spring moves from the tapered surface to the second abutting surface.

12. The spring mounting structure according to claim 11, wherein the protruding structure includes a wall facing an outer face of the compression spring.

13. The spring mounting structure according to claim 11, wherein the protruding structure includes a boss facing an inner surface of the compression spring.

14. A sheet housing device, comprising:

a sheet housing configured to house a sheet;

a handle mounted to the sheet housing, with the handle being movable between a housing position and a pull-out position;

the spring mounting structure according to claim 13;

the compression spring configured to bias the handle from the pull-out position toward the housing position; and a handle holder configured to hold the handle mounted to the sheet housing in the sheet housing, wherein the handle is the first structural member, and the handle holder is the second structural member.

15. An image forming apparatus, comprising the spring mounting structure according to claim 11.

16. A spring mounting structure, comprising:

a first structural member including, a first abutting surface configured to abut on a first end of a compression spring; and a protruding structure configured to receive the compression spring and temporarily hold the compression spring in an uncompressed state; and a second structural member including, a second abutting surface configured to abut on a second end of the compression spring; and a tapered surface, wherein in response to the second structural member and the first structural member being assembled in a first assembling direction that intersects a compression direction of the compression spring, the tapered surface is configured to guide the second end of the compression spring in the uncompressed state temporarily held by the protruding structure to the second abutting surface such that the compression spring temporarily held by the protruding structure is in a compressed state between the first abutting surface and the second abutting surface, wherein the first structural member or the second structural member has a viewing window to visually recognize the compression spring from an outside after a completion of assembly of the second structural member and the first structural member.

17. The spring mounting structure according to claim 16, wherein the protruding structure includes a wall facing an outer face of the compression spring.

18. The spring mounting structure according to claim 16, wherein the protruding structure includes a boss facing an inner surface of the compression spring.

19. A sheet housing device, comprising:
a sheet housing configured to house a sheet;
a handle mounted to the sheet housing, with the handle being movable between a housing position and a pull-out position;
the spring mounting structure according to claim 16;
the compression spring configured to bias the handle from the pull-out position toward the housing position; and
a handle holder configured to hold the handle mounted to the sheet housing in the sheet housing, wherein
the handle is the first structural member, and
the handle holder is the second structural member.

20. An image forming apparatus, comprising the spring mounting structure according to claim 16.

* * * * *

22